(12) United States Patent
Hayashi et al.

(10) Patent No.: US 11,040,578 B2
(45) Date of Patent: Jun. 22, 2021

(54) PNEUMATIC TIRE

(71) Applicant: BRIDGESTONE CORPORATION, Tokyo (JP)

(72) Inventors: Shintaro Hayashi, Hachioji (JP); Shungo Fujita, Kunitachi (JP)

(73) Assignee: BRIDGESTONE CORPORATION, Tokyo (JP)

( * ) Notice: Subject to any disclaimer, the term of this patent is extended or adjusted under 35 U.S.C. 154(b) by 698 days.

(21) Appl. No.: 15/575,412

(22) PCT Filed: Apr. 20, 2016

(86) PCT No.: PCT/JP2016/002113
§ 371 (c)(1),
(2) Date: Nov. 20, 2017

(87) PCT Pub. No.: WO2016/194287
PCT Pub. Date: Dec. 8, 2016

(65) Prior Publication Data
US 2018/0154703 A1 Jun. 7, 2018

(30) Foreign Application Priority Data

Jun. 3, 2015 (JP) .............................. JP2015-113384
Jun. 3, 2015 (JP) .............................. JP2015-113386

(51) Int. Cl.
*B60C 11/11* (2006.01)
*B60C 11/03* (2006.01)
*B60C 11/13* (2006.01)
*B60C 11/12* (2006.01)

(52) U.S. Cl.
CPC .......... *B60C 11/1384* (2013.01); *B60C 11/03* (2013.01); *B60C 11/0309* (2013.01); *B60C 11/11* (2013.01); *B60C 11/12* (2013.01); *B60C 11/1392* (2013.01); *B60C 2011/0369* (2013.01); *B60C 2011/0372* (2013.01);
(Continued)

(58) Field of Classification Search
CPC ............ B60C 11/1353; B60C 11/1384; B60C 11/1392; B60C 11/1307
See application file for complete search history.

(56) References Cited

U.S. PATENT DOCUMENTS 2,706,509 A * 4/1955 White .................... B60C 11/24
152/209.21
4,282,915 A 8/1981 Fontaine
(Continued)

FOREIGN PATENT DOCUMENTS

AU 2011309648 B2 2/2015
CN 101152824 A 4/2008
(Continued)

OTHER PUBLICATIONS

Machine Translation: JP-2002029224-A; Ochi, Naoya; (Year: 2020).*
(Continued)

*Primary Examiner* — Kendra Ly
(74) *Attorney, Agent, or Firm* — Kenja IP Law PC

(57) ABSTRACT

A pneumatic tire comprises: a first block 71 located on a tire equatorial plane and having a recess 62 that inclines with respect to a tire width direction; and a second block 72 located to face the recess of the first block.

18 Claims, 4 Drawing Sheets

(52) U.S. Cl.
CPC ............... *B60C 2011/0383* (2013.01); *B60C 2011/1213* (2013.01); *B60C 2011/1361* (2013.01)

(56) References Cited

U.S. PATENT DOCUMENTS

| | | | |
|---|---|---|---|
| 2001/0032691 A1* | 10/2001 | Ohsawa | B60C 11/13 152/209.18 |
| 2008/0073012 A1 | 3/2008 | Miyazaki | |
| 2009/0320982 A1* | 12/2009 | Ochi | B60C 11/0306 152/209.25 |
| 2014/0014244 A1 | 1/2014 | Takano | |
| 2014/0174618 A1 | 6/2014 | Kiwaki | |

FOREIGN PATENT DOCUMENTS

| | | | | |
|---|---|---|---|---|
| CN | 301262781 | S | 6/2010 | |
| CN | 103370213 | A | 10/2013 | |
| CN | 205768392 | U | 12/2016 | |
| EP | 2676816 | A1 | 12/2013 | |
| JP | S5856903 | A | 4/1983 | |
| JP | 02179508 | A * | 7/1990 | ......... B60C 11/1384 |
| JP | H08258513 | A | 10/1996 | |
| JP | 11286204 | A * | 10/1999 | ......... B60C 11/1384 |
| JP | 2002029224 | A * | 1/2002 | ............. B60C 11/11 |
| JP | 2003341306 | A | 12/2003 | |
| JP | 2006088815 | A | 4/2006 | |
| JP | 2008037219 | A | 2/2008 | |
| JP | 2008044441 | A | 2/2008 | |
| JP | 2010260471 | A | 11/2010 | |
| JP | 2012166757 | A | 9/2012 | |
| JP | 2014015155 | A | 1/2014 | |
| WO | 2011111319 | A1 | 9/2011 | |
| WO | 2012043036 | A1 | 4/2012 | |

OTHER PUBLICATIONS

Machine Translation: JP-02179508-A; Watanabe, Susumu; (Year: 2020).*
Machine Translation: JP-11286204-A;Ishiyama, Makoto; (Year: 2020).*
May 18, 2018, Search Result of Extended European Search Report issued by the European Patent Office in the corresponding European Patent Application No. 16802734.0.
Jul. 19, 2016, International Search Report issued in the International Patent Application No. PCT/JP2016/002113.
Jun. 28, 2017, Search Result of Office Action issued by the State Intellectual Property Office in the corresponding Chinese Patent Application No. 201610391108.7.

* cited by examiner

PNEUMATIC TIRE

TECHNICAL FIELD

This disclosure relates to a pneumatic tire.

This application claims priority to Japanese Patent Application No. 2015-113384 filed on Jun. 3, 2015 and Japanese Patent Application No. 2015-113386 filed on Jun. 3, 2015, the entire disclosures of which are incorporated herein by reference.

BACKGROUND

A conventionally known tread pattern that achieves both drainage performance and traction performance of a tire is a pattern having circumferential main grooves and width direction grooves (for example, see JP 2008-44441 A (PTL 1)). Such a tread pattern can ensure traction performance by an edge effect obtained by partitioning a land portion into blocks by width direction grooves, while enhancing drainage performance by circumferential main grooves and width direction grooves having large groove widths. Tires having such a tread pattern as described in PTL 1 include tires in which width direction grooves have large inclination angles with respect to the tire circumferential direction in order to ensure traction performance on a rough road such as swampy ground, gravel road, or snowy road.

CITATION LIST

Patent Literature

PTL 1: JP 2008-44441 A

SUMMARY

Technical Problem

A tire in which width direction grooves have large inclination angles with respect to the tire circumferential direction as in PTL 1 tends to have loud vehicle exterior noise. In recent years, the demand for reducing pass-by noise of vehicles running in urban areas and the like is growing. Hence, a technique that can not only increase block rigidity to improve wear resistance but also improve quietness is required also for a tire having high traction performance on a rough road such as swampy ground, gravel road, or snowy road.

It could therefore be helpful to provide a pneumatic tire that can improve quietness and wear resistance while further enhancing traction performance.

Solution to Problem

We thus provide the following.

A pneumatic tire according to this disclosure comprises: one or more land portions each of which is sandwiched between a plurality of circumferential main grooves continuously extending in a tire circumferential direction, on a tread surface, wherein at least one of the one or more land portions is partitioned into a plurality of blocks by an auxiliary groove that includes at least an inclined groove extending while being inclined with respect to a tire width direction, and in a developed view of the tread surface, the plurality of blocks include: a first block located on a tire equatorial plane and having a recess that inclines with respect to the tire width direction; and a second block located to face the recess of the first block.

The pneumatic tire according to this disclosure can improve quietness and wear resistance while further enhancing traction performance.

Here, the "tread surface" is the outer circumferential surface of the whole tire, which comes into contact with the road surface when the tire attached to an applicable rim and filled to a prescribed internal pressure rolls in the state of being placed under a load corresponding to maximum load capability. The "applicable rim" is an approved rim defined in any of the below-mentioned standards according to tire size ("design rim" in Year Book of TRA, "measuring rim" in Standards Manual of ETRTO). The "prescribed internal pressure" is air pressure corresponding to maximum load capability as defined in the standard. The "maximum load capability" is maximum mass permitted to be loaded onto the tire in the standard. The standard is determined according to an effective industrial standard in areas where tires are produced or used. Examples of the standard include Year Book of the Tire and Rim Association, Inc. (TRA) in the United States, Standards Manual of the European Tyre and Rim Technical Organisation (ETRTO) in Europe, and JATMA Year Book of the Japan Automobile Tyre Manufacturers Association (JATMA) in Japan.

The expression that circumferential main grooves "continuously extend in a tread circumferential direction" means continuously extending in the tread circumferential direction, including the case of continuously extending in the tread circumferential direction in a zigzag shape and the case of continuously extending in the tread circumferential direction in a bent shape.

The expression "located to face" means that they face each other at least partially.

In the pneumatic tire according to this disclosure, the plurality of blocks may further include a third block located to face a first sidewall portion in one block portion from among two block portions that define the recess of the first block, the first sidewall portion being adjacent to the recess.

With this structure, wear resistance and traction performance can be further improved.

In the pneumatic tire according to this disclosure, a tire circumferential length of a sidewall defining the recess in an other block portion from among the two block portions that define the recess of the first block may be longer than a tire circumferential length of a sidewall defining the recess in the one block portion.

With this structure, traction performance can be further improved.

In the pneumatic tire according to this disclosure, the second block may have an end extending toward the recess of the first block, and in the end of the second block extending toward the recess of the first block, a sidewall facing the recess of the first block may be chamfered on a tread surface side.

With this structure, sufficient block rigidity can be ensured to improve wear resistance, while further enhancing traction performance.

Here, the expression that an end "extends toward the recess" means that the recess is located on an extension of the tire width direction centerline of the block in and around the end.

In the pneumatic tire according to this disclosure, a sidewall portion in an other block portion from among two block portions may be located in an extending direction of the inclined groove inclined with respect to the tire width direction, the sidewall portion being adjacent to the recess.

With this structure, traction performance can be further improved while ensuring drainage performance.

In the pneumatic tire according to this disclosure, in one block portion and an other block portion of the first block that define the recess of the first block, respective sidewalls defining the recess of the first block may be chamfered on a tread surface side, and in the developed view of the tread surface, a connecting portion connecting, in the recess of the first block, the respective sidewalls of the one block portion and the other block portion defining the recess of the first block may have a curved shape.

With this structure, block rigidity can be ensured to further improve wear resistance, while further enhancing traction performance.

Here, the expression "chamfered on a tread surface side" includes the case where the whole part from the tread surface to the groove bottom is chamfered.

In the pneumatic tire according to this disclosure, the inclined groove may be sandwiched between another first block adjacent to the first block and the second block, and a sidewall of the second block defined by the inclined groove may have a step portion protruding toward the inclined groove.

With this structure, traction performance can be further improved.

In the pneumatic tire according to this disclosure, a tire circumferential dimension of the second block may increase outward in the tire width direction relative to a tire width direction central portion.

Here, the expression "a tire circumferential dimension of the second block increases outward in the tire width direction relative to a tire width direction central portion" includes the case where the tire circumferential dimension of the second block is constant outward in the tire width direction and the case where the ratio of increase of the tire circumferential dimension of the second block changes outward in the tire width direction, but does not include the case where the tire circumferential dimension of the second block decreases outward in the tire width direction.

With this structure, steering stability can be improved.

In the pneumatic tire according to this disclosure, the first block may have a depression formed by depressing inward an opposite sidewall to a sidewall where the recess is formed, and the depression may face a protrusion of a sidewall of another first block, adjacent to the first block, where the depression is formed.

With this structure, traction performance can be further improved.

In the pneumatic tire according to this disclosure, the second block may have an end extending to inside of the recess of the first block along a side surface of the recess.

With this structure, traction performance can be further improved.

In the pneumatic tire according to this disclosure, the second block may have a stepped recess having one end open to one of the plurality of circumferential main grooves and having, at a bottom thereof, a step portion protruding in a tire radial direction.

With this structure, steering stability can be enhanced, and also traction performance and block rigidity can be enhanced to further improve wear resistance.

In the pneumatic tire according to this disclosure, in the developed view of the tread surface, the recess of the first block may have a triangular shape.

Here, the expression "triangular shape" means any shape that is triangular as a whole, including the case of having a bent side or a rounded corner.

With this structure, traction performance can be further improved.

In the pneumatic tire according to this disclosure, in the developed view of the tread surface, an end of the second block extending toward the recess of the first block may extend from an opening position of the recess of the first block to inside of the recess of the first block by at least ⅓ of a distance between the opening position of the recess of the first block and a wall portion of the recess farthest from the opening position.

With this structure, block rigidity can be further increased to further enhance wear resistance, while enhancing quietness.

In the pneumatic tire according to this disclosure, the first block may have a sipe having one end open to the recess of the first block.

With this structure, uniform block rigidity can be achieved to further enhance wear resistance.

In the pneumatic tire according to this disclosure, in the developed view of the tread surface, the sipe may have a bent portion, and have an other end open to the auxiliary groove.

With this structure, wear resistance can be further enhanced.

Advantageous Effect

It is thus possible to provide a pneumatic tire that can improve quietness and wear resistance while further enhancing traction performance.

DETAILED DESCRIPTION

Disclosed embodiments are described in detail below, with reference to the drawings.

Embodiment 1

Figure 1:
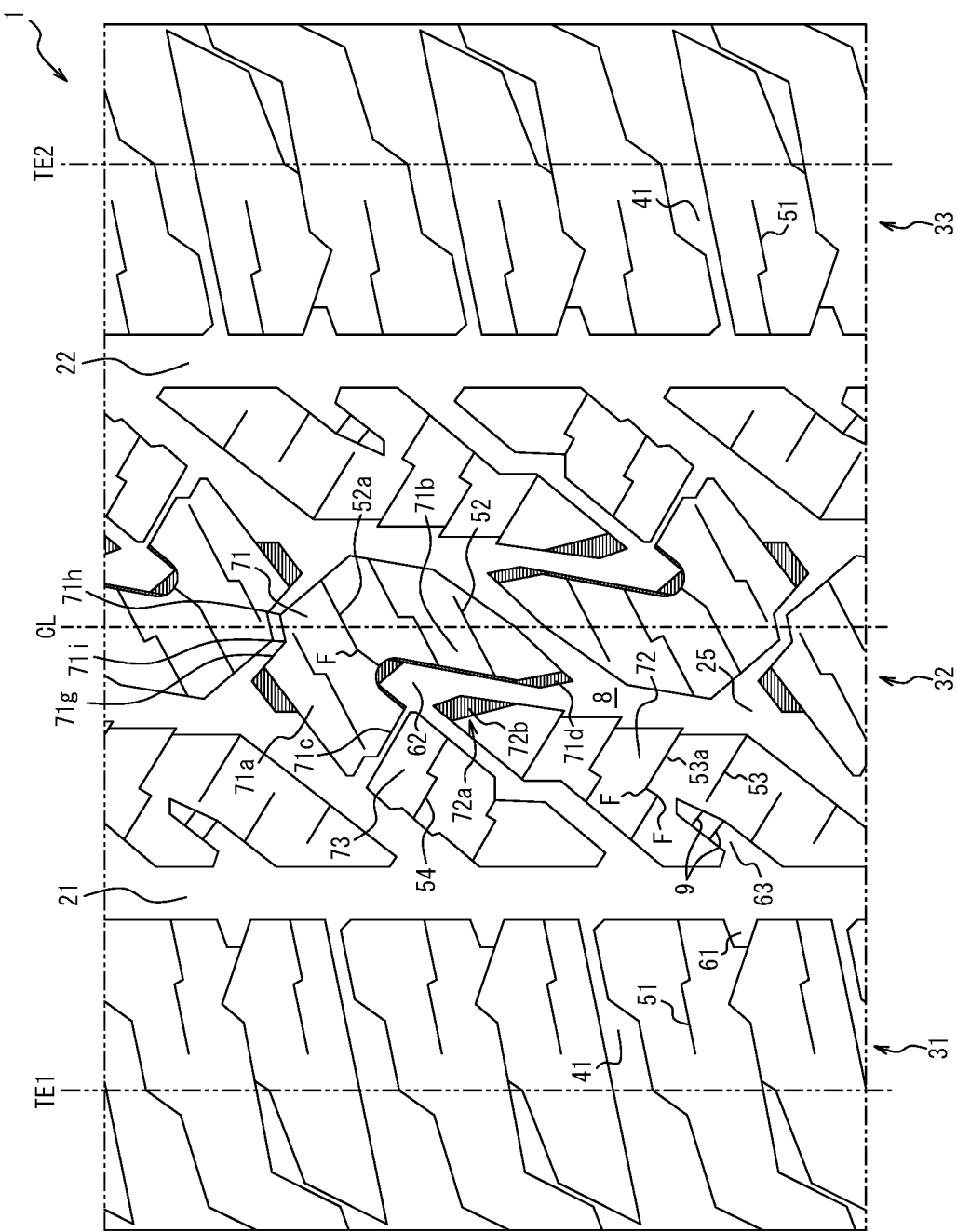
FIG. 1 is a developed view illustrating a tread pattern of a pneumatic tire according to Embodiment 1.
Figure 2:
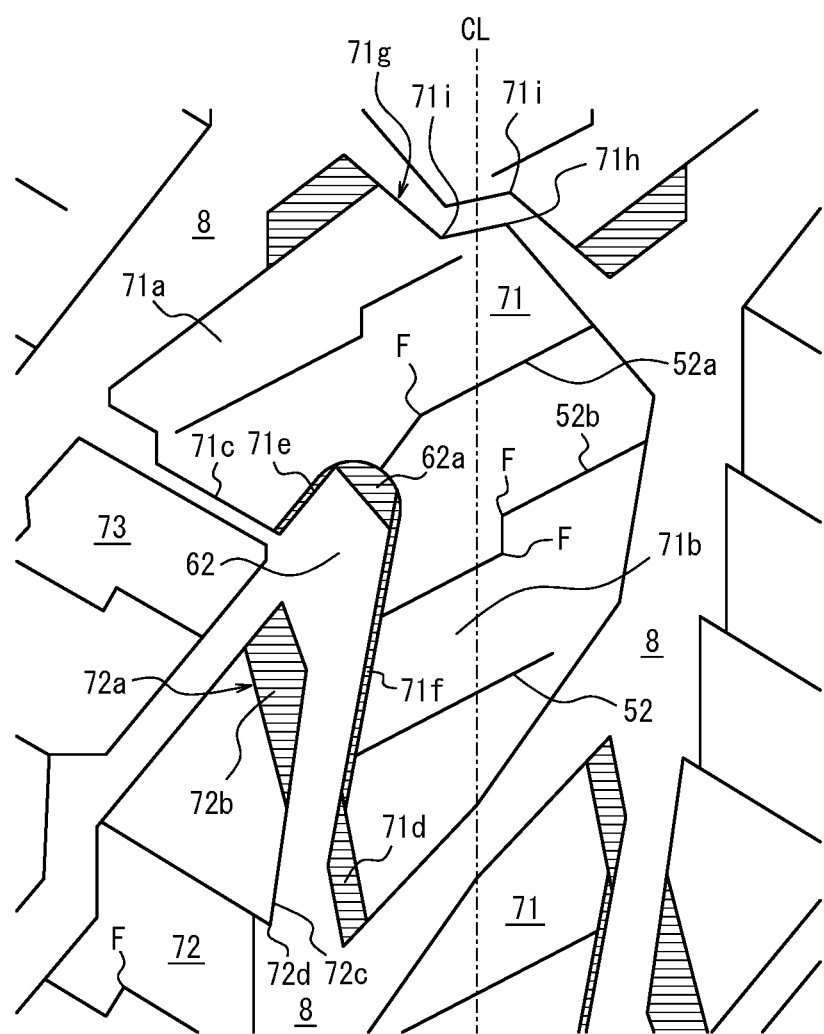
FIG. 2 is a partially enlarged view of a central land portion of the pneumatic tire in FIG. 1.

Embodiment 1 is described first, with reference to FIGS. 1 and 2. FIG. 1 is a developed view illustrating a tread pattern of a pneumatic tire (hereafter also simply referred to as "tire") according to Embodiment 1, and is a developed view of a tread surface in the state where the tire is attached to an applicable rim, filled to a prescribed internal pressure, and placed under no load. FIG. 2 is a partially enlarged view of the below-mentioned central land portion in FIG. 1. The following describes the shapes and dimensions of the tread pattern in a developed view of the tread surface, unless otherwise noted.

In the tire according to Embodiment 1, circumferential main grooves continuously extending in the tread circumferential direction are formed on a tread surface 1, as illustrated in FIG. 1. In the example in FIG. 1, the tread surface 1 has two circumferential main grooves 21 and 22 each extending linearly along the tread circumferential direction. In this embodiment, the two circumferential main grooves 21 and 22 have the same shape. These circumferential main grooves 21 and 22 ensure the drainage performance of the tire.

In the example in FIG. 1, the two circumferential main grooves 21 and 22 are symmetric with respect to a tire equatorial plane CL.

The two circumferential main grooves 21 and 22 and tread edges TE1 and TE2 define a plurality of land portions, as illustrated in FIG. 1. In detail, the circumferential main groove 21 on one side in the tread width direction and the tread edge TE1 on the one side define an outer land portion 31 on the one side in the tread width direction. The circumferential main groove 21 and the circumferential main groove 22 on the other side in the tread width direction define a central land portion 32. The circumferential main groove 22 and the tread edge TE2 on the other side define an outer land portion 33 on the other side in the tread width direction.

In the illustrated example, the outer land portion 31 and the outer land portion 33 have the same dimension in the tread width direction.

The "tread edge" mentioned here is the outermost part of the tread surface in the tread width direction.

The outer land portion 31 in this embodiment has a lug groove 41 having one end open to the tread edge TE1 and the other end open to the circumferential main groove 21. The outer land portion 31 in this embodiment also has a width direction recess 61 which is a recess outward in the tire width direction, in a sidewall defined by the circumferential main groove 21. The outer land portion 31 in this embodiment further has a sipe 51 having one end open to the circumferential main groove 21 and the other end terminating within the outer land portion 31.

The "sipe" mentioned here is a thin slit cut from the outer surface of a block to the inside, and can be closed upon contact with the ground.

The outer land portion 33 on the other side in this embodiment has a lug groove 41, a width direction recess 61, and a sipe 51, as with the outer land portion 31 on the one side.

In this embodiment, the central land portion 3 sandwiched between the circumferential main grooves 21 and 22 is partitioned into a plurality of blocks by auxiliary grooves 25 that include at least an inclined groove 8 extending while inclined with respect to the tire width direction. In detail, the central land portion 32 is partitioned into the following blocks by the auxiliary grooves 25 that include at least the inclined groove 8: a first block 71 located at the tire width direction center of the central land portion 32 and having a recess 62 that inclines with respect to the tire width direction; a second block 72 located to face the recess 62 of the first block 71; and a third block 73 located to face a first sidewall portion 71c in one block portion 71a from among two block portions 71a and 71b of the first block 71 that define the recess 62 of the first block 71, the first sidewall portion 71c being adjacent to the recess 62.

Here, the expression "located to face" means that they face each other at least partially.

In this embodiment, the first block 71 is located at the tire width direction center of the central land portion 32. Moreover, in this embodiment, the position of the tire width direction center of the central land portion 32 and the position of the tire equatorial plane CL match each other.

In the tire according to Embodiment 1, the first block 71 has the recess 62 that inclines with respect to the tire width direction. Such a recess 62 catches and clears mud, gravel, snow, etc., so that traction performance can be enhanced. In particular, the first block 71 having the recess 62 is located on the tire equatorial plane CL at which the tire has the longest ground contact length during running and that significantly influences traction performance, and therefore traction performance can be further enhanced. Moreover, the second block 72 is located to face the recess 62 of the first block 71, so that excessive mud, gravel, snow, etc. are kept from entering the recess 62 of the first block 71 to thus appropriately adjust the amount of mud, gravel, snow, etc. entering the recess 62. This also prevents concentration of grooves near the recess 62, and so the recess 62 does not cause noise. Furthermore, application of large stress to the sidewall of the first block 71 near the recess 62 is suppressed to enhance the rigidity of the first block 71, thus further enhancing wear resistance.

Hence, the pneumatic tire according to this embodiment can improve quietness while further enhancing traction performance.

In the tire according to Embodiment 1 illustrated in FIG. 1, the third block 73 is further provided to face the first sidewall portion 71c in one block portion 71a from among the two block portions 71a and 71b that define the recess 62 of the first block 71, the first sidewall portion 71c being adjacent to the recess 62. The sidewall of such a third block 73 guides mud, gravel, snow, etc. to the recess 62, so that traction performance can be further enhanced. Moreover, in the case where the first block 71 deforms as if collapsing toward the third block 73, the third block 73 can support the first block 71. This enhances block rigidity to further enhance wear resistance.

In this embodiment, a second sidewall portion 71d in the other block portion 71b from among the two block portions 71a and 71b is located in the extending direction of the inclined groove 8 inclined with respect to the tire width direction in the auxiliary grooves 25, the second sidewall portion 71d being adjacent to the recess 62. With this structure, the second sidewall portion 71d catches mud, gravel, snow, etc. guided along the inclined groove 8 and causes the flow of mud, gravel, snow, etc. in the tire circumferential direction to branch into two directions, thus allowing part of mud, gravel, snow, etc. to flow in the tire circumferential direction while guiding part of mud, gravel, snow, etc. to the recess 62. In this way, traction performance can be further improved while ensuring drainage performance.

The inclined groove 8 inclines with respect to the tire width direction preferably in a range of 55° to 90°, and more preferably in a range of 60° to 90°. This distributes the ground contact timing of the groove wall of the inclined groove 8 that guides mud, gravel, snow, etc. to the recess 62 most, and thus further improves quietness.

In this embodiment, all auxiliary grooves 25 extending in the central land portion 32 incline with respect to the tire width direction in a range of 45° to 90°.

Moreover, in this embodiment, the first block 71, the second block 72, and the third block 73 are symmetric with respect to a point on the tire equatorial plane CL.

Furthermore, in this embodiment, the first block 71, the second block 72, and the third block 73 are repeatedly provided in the tire circumferential direction.

In the embodiment illustrated in FIGS. 1 and 2, in the one block portion 71a and the other block portion 71b of the first block 71 that define the recess 62 of the first block 71, respective sidewalls 71e and 71f defining the recess 62 of the first block 71 are chamfered on the tread surface side. In addition, in the recess 62 of the first block 71, a connecting portion 62a between the sidewall 71e of the one block portion 71a defining the recess 62 and the sidewall 71f of the other block portion 71b defining the recess 62 has a curved shape. This facilitates discharge of mud, gravel, snow, etc., which have entered the recess 62, out of the recess 62 from the sidewalls 71e and 71f and the connecting portion 62a, and thus improves traction performance. Moreover, since the connecting portion 62a has a curved shape, concentration of strain is reduced, and block rigidity is enhanced to improve wear resistance. Particularly in this embodiment, the whole part of the sidewalls 71e and 71f and the connecting portion 62a defining the recess 62 inclines with respect to the bottom of the recess 62.

In the embodiment illustrated in FIGS. 1 and 2, the tire circumferential length of the sidewall 71f defining the recess 62 in the other block portion 71b is longer than the tire circumferential length of the sidewall 71e defining the recess 62 in the one block portion 71a. This eases guiding mud, gravel, snow, etc., which have guided by the sidewall of the second block 72, into the recess 62 along the second sidewall portion 71d, and thus improves traction performance.

In the embodiment illustrated in FIGS. 1 and 2, the second sidewall portion 71d is chamfered on the tread surface side. In this embodiment, the whole second sidewall portion 71d is chamfered so as to incline with respect to the groove bottom of the auxiliary groove 25.

In the embodiment illustrated in FIGS. 1 and 2, the first block 71 has a plurality of sipes 52. In detail, the first block 71 has a sipe 52a having one end open to the connecting portion 62a of the recess 62 and the other end open to the auxiliary groove 25. This makes the rigidity of the first block 71 uniform, thus improving wear resistance. Particularly in the embodiment illustrated in FIG. 1, the sipe 52a has one bent portion F. Accordingly, in this embodiment, when one of the two parts of the first block 71 divided by the sipe 52a is subjected to a force such as a side force and deforms as if collapsing toward the other part, they can support each other. With cooperative movement of the auxiliary groove 25 and the sipe 52a, concentration of large stress on one of the parts divided by the sipe 52a is suppressed to improve wear resistance. In the embodiment illustrated in FIG. 1, a sipe 52b adjacent to the sipe 52a has two bent portions F. Such a sipe 52b also contributes to higher wear resistance of the first block 71.

In the embodiment illustrated in FIGS. 1 and 2, the first block 71 has a depression 71g formed by depressing inward the opposite sidewall to the sidewall where the recess 62 is formed. The depression 71g faces a protrusion 71h of the sidewall of another first block 71, adjacent to the first block 71, where the depression 71g is formed. Particularly in this embodiment, the depression 71g is formed so that a part 71i of the depression 71g farthest from the wall portion where the depression 71g is open faces the protrusion 71h. Such a depression 71g increases edge components, with it being possible to further enhance traction performance.

In the embodiment illustrated in FIGS. 1 and 2, the tire circumferential dimension of the second block 72 increases outward in the tire width direction relative to a tire width direction central portion. This enhances the rigidity of the tire width direction outer side of the second block 72 that is subjected to a large side force in the state where the load of an outer wheel increases during cornering and ground contact pressure increases. Steering stability can thus be enhanced.

In the embodiment illustrated in FIGS. 1 and 2, the second block 72 has an end 72a extending to the inside of the recess 62 of the first block 71 along the side surface of the recess 62. With this structure, mud, gravel, snow, etc. are guided by the sidewall of the end 72a to easily enter into the recess 62, so that traction performance can be improved. Moreover, since the end 72a extends to the inside of the recess 62 of the first block 71, such concentration of grooves near the recess 62 that causes a large space to form near the recess 62 can be prevented. This enhances quietness. In addition, such concentration of mud, gravel, snow, etc. in the recess 62 that causes large stress on the first block 71 can be prevented to thus enhance the wear resistance of the first block 71.

In this case, the end 72a of the second block 72 preferably extends from the opening position of the recess 62 of the first block 71 to the inside of the recess 62 of the first block 71, by at least ⅓ of the distance between the opening position of the recess 62 of the first block 71 and the wall portion of the recess 62 farthest from the opening position. With this structure, such concentration of grooves in the recess 62 that causes a large space to form in the recess 62 can be prevented. This enhances quietness. In addition, such concentration of mud, gravel, snow, etc. in the recess 62 that causes large stress on the first block 71 can be prevented to thus enhance the rigidity of the first block 71 and further enhance wear resistance.

Particularly in the embodiment illustrated in FIGS. 1 and 2, in the end 72a of the second block, a sidewall 72b facing the recess 62 of the first block 71 is chamfered on the tread surface side. With this structure, mud, gravel, snow, etc. are easily guided to the inside of the recess 62 by the chamfered sidewall 72b, so that traction performance can be further improved. In this embodiment, the whole sidewall 72b is chamfered so as to incline with respect to the groove bottom of the auxiliary groove 25.

In the embodiment illustrated in FIGS. 1 and 2, the second block 72 has a stepped recess 63 having one end open to the circumferential main groove 21 or 22 and having, at its bottom, a step portion 9 protruding in the tire radial direction. Since the stepped recess 63 catches mud, gravel, snow, etc. during cornering, steering stability during cornering can be enhanced. Moreover, since the bottom of the stepped recess 63 is in a staircase shape, the end of the step portion 9 functions as an edge, and therefore edge components can be increased to further enhance traction performance. In addition, the staircase-shaped bottom enhances the block rigidity of the second block 72.

In the embodiment illustrated in FIGS. 1 and 2, the second block 72 has a plurality of sipes 53 including a sipe 53a having two bent portions F. Moreover, the third block 73 has a sipe 54 having two bent portions.

In the embodiment illustrated in FIGS. 1 and 2, the inclined groove 8 that extends in the direction in which the second sidewall portion 71d of the other block portion 71b of the first block 71 is located is sandwiched between another first block 71 adjacent to the first block 71 and the second block 72. Moreover, a sidewall 72c of the second block 72 defined by the inclined groove 8 has a step portion 72d protruding toward the inclined groove 8. With this structure, the step portion 72d protruding toward the inclined groove 8 increases edge components, so that traction performance can be further improved.

Furthermore, in the embodiment illustrated in FIG. 1, the recess 62 of the first block 71 has a triangular shape in a developed view of the tread surface. With this structure, mud, gravel, snow, etc. can be compressed in the connecting portion 62a at the vertex of the triangular shape. This increases the shear force for compressed mud, gravel, snow, etc., and improves traction performance.

Embodiment 2

Figure 3:
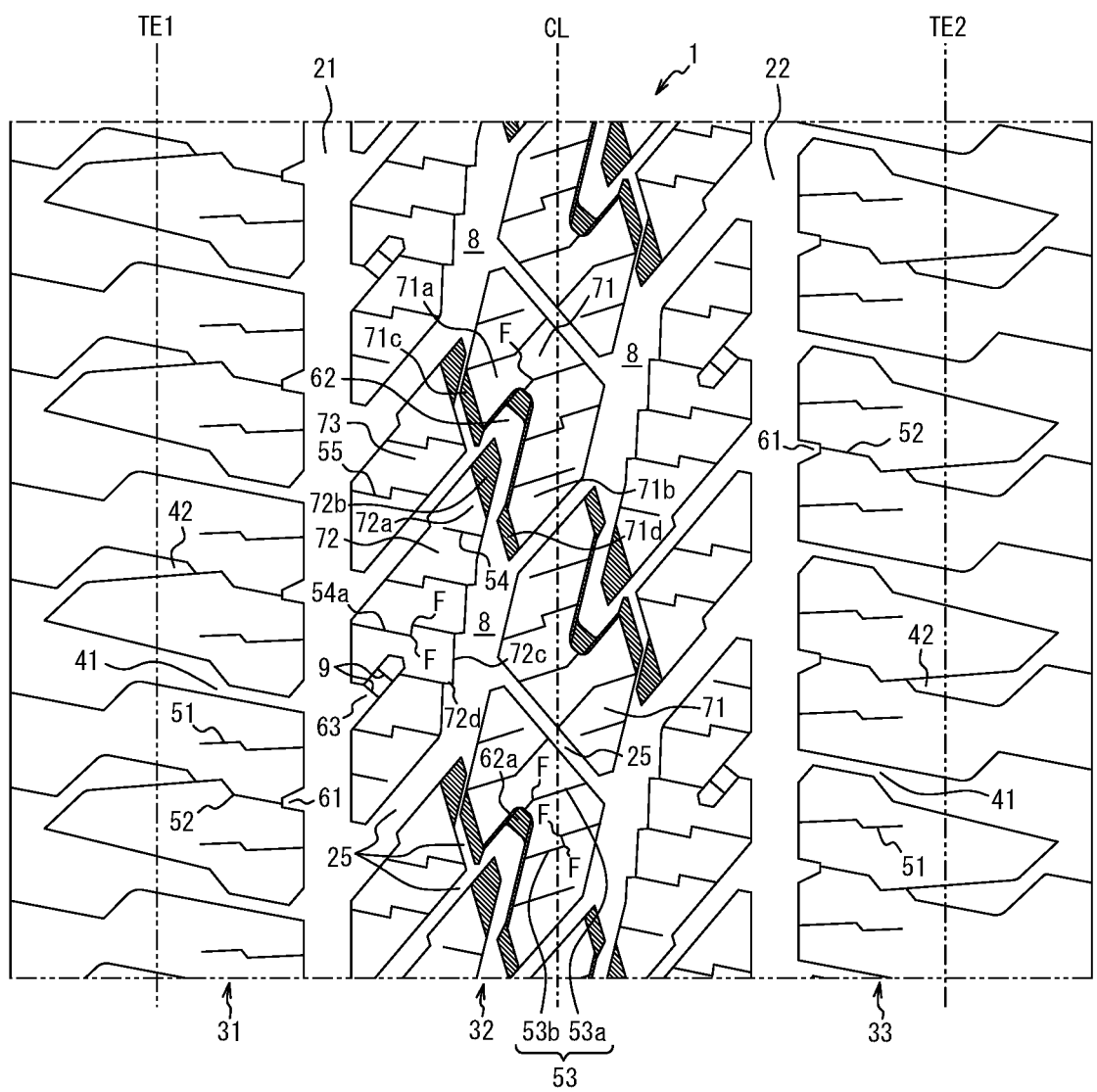
FIG. 3 is a developed view illustrating a tread pattern of a pneumatic tire according to Embodiment 2.
Figure 4:
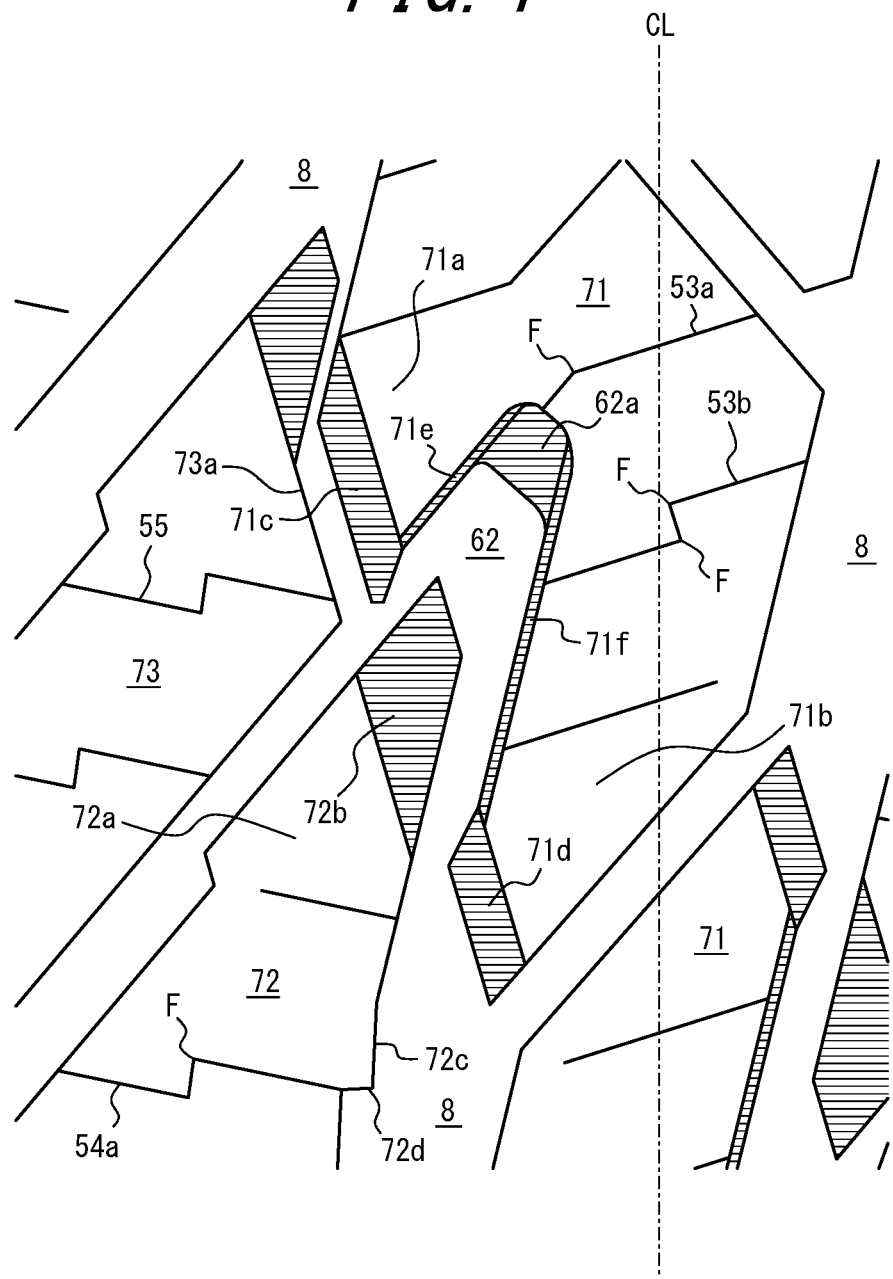
FIG. 4 is a partially enlarged view of a central land portion of the pneumatic tire in FIG. 3.

Embodiment 2 is described next, with reference to FIGS. 3 and 4. FIG. 3 is a developed view illustrating a tread pattern of a pneumatic tire (hereafter also simply referred to as "tire") according to Embodiment 2, and is a developed view of a tread surface in the state where the tire is attached to an applicable rim, filled to a prescribed internal pressure, and placed under no load. FIG. 4 is a partially enlarged view of the below-mentioned central land portion in FIG. 3. In Embodiment 2 illustrated in FIGS. 3 and 4, the same components as those in Embodiment 1 are given the same reference signs.

In the tire according to Embodiment 2, circumferential main grooves continuously extending in the tread circumferential direction are formed on a tread surface 1, as illustrated in FIG. 3. In the example in FIG. 3, the tread surface 1 has two circumferential main grooves 21 and 22 each extending linearly along the tread circumferential direction. In this embodiment, the two circumferential main grooves 21 and 22 have the same shape. These circumferential main grooves 21 and 22 ensure the drainage performance of the tire.

In the example in FIG. 3, the two circumferential main grooves 21 and 22 are symmetric with respect to a tire equatorial plane CL.

The two circumferential main grooves 21 and 22 and tread edges TE1 and TE2 define a plurality of land portions, as illustrated in FIG. 3. In detail, the circumferential main groove 21 on one side in the tread width direction and the tread edge TE1 on the one side define an outer land portion 31 on the one side in the tread width direction. The circumferential main groove 21 and the circumferential main groove 22 on the other side in the tread width direction define a central land portion 32. The circumferential main groove 22 and the tread edge TE2 on the other side define an outer land portion 33 on the other side in the tread width direction.

In the illustrated example, the outer land portion 31 and the outer land portion 33 have the same dimension in the tread width direction.

The outer land portion 31 in this embodiment has a lug groove 41 having one end open to the tread edge TE1 and the other end open to the circumferential main groove 21, and a lug groove 42 having one end open to the tread edge TE1 and the other end terminating within the outer land portion 31. The outer land portion 31 in this embodiment also has a width direction recess 61 which is a recess outward in the tire width direction, in a sidewall defined by the circumferential main groove 21. The outer land portion 31 in this embodiment further has a sipe 51 having one end open to the circumferential main groove 21 and the other end terminating within the outer land portion 31, and a sipe 52 having one end open to the lug groove 42 and the other end open to the width direction recess 61.

The outer land portion 33 on the other side in this embodiment has lug grooves 41 and 42, a recess 61, and sipes 51 and 52, as with the outer land portion 31 on the one side.

In this embodiment, the central land portion 3 sandwiched between the circumferential main grooves 21 and 22 is partitioned into a plurality of blocks by auxiliary grooves 25 that include at least an inclined groove 8 extending while inclined with respect to the tire width direction. In detail, the central land portion 32 is partitioned into the following blocks by the auxiliary grooves 25 that include at least the inclined groove 8: a first block 71 located at the tire width direction center of the central land portion 32 and having a recess 62 that inclines with respect to the tire width direction; a second block 72 located to face the recess 62 of the first block 71; and a third block 73 located to face a first sidewall portion 71c in one block portion 71a from among two block portions 71a and 71b of the first block 71 that define the recess 62 of the first block 71, the first sidewall portion 71c being adjacent to the recess 62.

In this embodiment, the first block 71 is located at the tire width direction center of the central land portion 32. Moreover, in this embodiment, the position of the tire width direction center of the central land portion 32 and the position of the tire equatorial plane CL match each other.

In the tire according to Embodiment 2, quietness can be improved and sufficient block rigidity can be ensured to improve wear resistance while enhancing traction performance, as in Embodiment 1.

Particularly in Embodiment 2 in FIG. 3, the first block 71 is located on the tire equatorial plane CL at which the tire has the longest ground contact length during running and that significantly influences traction performance, and therefore traction performance can be further enhanced.

In this embodiment, a second sidewall portion 71d in the other block portion 71b from among the two block portions 71a and 71b is located in the extending direction of the inclined groove 8 inclined with respect to the tire width direction in a range of 55° to 90° in the auxiliary grooves 25, the second sidewall portion 71d being adjacent to the recess 62. The inclined groove 8 inclines with respect to the tire width direction preferably in a range of 60° to 90°.

In this embodiment, all auxiliary grooves 25 extending in the central land portion 32 incline with respect to the tire width direction in a range of 45° to 90°.

Moreover, in this embodiment, the first block 71, the second block 72, and the third block 73 are symmetric with respect to a point on the tire equatorial plane CL.

Furthermore, in this embodiment, the first block 71, the second block 72, and the third block 73 are repeatedly provided in the tire circumferential direction.

In the embodiment illustrated in FIGS. 3 and 4, in the one block portion 71a and the other block portion 71b of the first block 71 that define the recess 62 of the first block 71, respective sidewalls 71e and 71f defining the recess 62 of the first block 71 are chamfered on the tread surface side. In addition, in the recess 62 of the first block 71, a connecting portion 62a between the sidewall 71e of the one block portion 71a defining the recess 62 and the sidewall 71f of the other block portion 71b defining the recess 62 has a curved shape in a developed view of the tread surface. This facilitates discharge of mud, gravel, snow, etc., which have entered the recess 62, out of the recess 62 from the sidewalls 71e and 71f and the connecting portion 62a, and thus improves traction performance. Moreover, since the connecting portion 62a has a curved shape, concentration of strain is reduced, and block rigidity is enhanced to improve wear resistance. Particularly in this embodiment, the whole part of the sidewalls 71e and 71f and the connecting portion 62a defining the recess 62 inclines with respect to the bottom of the recess 62.

Furthermore, in the embodiment illustrated in FIGS. 3 and 4, the recess 62 of the first block 71 has a triangular shape in a developed view of the tread surface. Accordingly, mud, gravel, snow, etc. can be compressed in the connecting portion 62a at the vertex of the triangular shape. This increases the shear force for compressed mud, gravel, snow, etc., and improves traction performance.

In the embodiment illustrated in FIGS. 3 and 4, the first sidewall portion 71c is chamfered on the tread surface side, and the second sidewall portion 71d is chamfered on the tread surface side. In this embodiment, the whole first sidewall portion 71c and second sidewall portion 71d are chamfered so as to incline with respect to the groove bottom of the auxiliary groove 25.

In the embodiment illustrated in FIGS. 3 and 4, the first block 71 has a plurality of sipes 53. In detail, the first block 71 has a sipe 53a having one end open to the connecting portion 62a of the recess 62 of the first block 71. This makes the rigidity of the first block 71 uniform, thus improving wear resistance. The other end of the sipe 53a is open to the auxiliary groove 25.

Particularly in the embodiment illustrated in FIG. 3, the sipe 53a has one bent portion F. The sipe 53a has the bent portion F, and has the other end open to the auxiliary groove 25. Accordingly, in this embodiment, when one of the two parts of the first block 71 divided by the sipe 53a is subjected to a force such as a side force and deforms as if collapsing toward the other part, they can support each other. With cooperative movement of the auxiliary groove 25 and the sipe 53a, concentration of large stress on one of the parts divided by the sipe 53a is suppressed. This enhances the rigidity of the first block 71 to improve wear resistance. In the embodiment illustrated in FIG. 3, a sipe 53b adjacent to the sipe 53a has two bent portions F. Such a sipe 53b also contributes to higher wear resistance of the first block 71.

In the embodiment illustrated in FIGS. 3 and 4, the second block 72 has an end 72a extending toward the recess 62 of the first block. With this structure, mud, gravel, snow, etc. are guided by the sidewall of the end 72a to easily enter into the recess 62, so that traction performance can be improved. Moreover, such concentration of grooves near the recess 62 that causes a large space to form in the recess 62 can be prevented. This enhances quietness. In addition, large stress acting on the sidewall of the first block 71 near the recess 62 can be prevented to thus enhance the rigidity of the first block 71 and further enhance wear resistance.

In the embodiment illustrated in FIGS. 3 and 4, in the end 72a of the second block, a sidewall 72b facing the recess 62 of the first block 71 is chamfered on the tread surface side. With this structure, mud, gravel, snow, etc. are easily guided to the inside of the recess 62 by the chamfered sidewall 72b, so that traction performance can be further improved. In this embodiment, the whole sidewall 72b is chamfered so as to incline with respect to the groove bottom of the auxiliary groove 25.

In the embodiment illustrated in FIGS. 3 and 4, the tire circumferential dimension of the second block 72 increases outward in the tire width direction relative to a tire width direction central portion. This enhances the rigidity of the tire width direction outer side of the second block 72 that is subjected to a large side force in the state where the load of an outer wheel increases during cornering and ground contact pressure increases. Steering stability can thus be enhanced.

In the embodiment illustrated in FIGS. 3 and 4, the end 72a of the second block 72 extends to the inside of the recess 62 of the first block 71. With this structure, such concentration of grooves in the recess 62 that causes a large space to form in the recess 62 can be prevented. This enhances quietness. In addition, such concentration of mud, gravel, snow, etc. in the recess 62 that causes large stress on the first block 71 can be prevented to thus enhance the wear resistance of the first block 71.

In this case, the end 72a of the second block 72 extending toward the recess 62 of the first block 71 preferably extends from the opening position of the recess 62 of the first block 71 to the inside of the recess 62 of the first block 71 by at least ⅓ of the distance between the opening position of the recess 62 of the first block 71 and the wall portion of the recess 62 of the first block 71 farthest from the opening position, in a developed view of the tread surface. With this structure, such concentration of grooves in the recess 62 that causes a large space to form in the recess 62 can be prevented. This enhances quietness. In addition, such concentration of mud, gravel, snow, etc. in the recess 62 that causes large stress on the first block 71 can be prevented to thus enhance the rigidity of the first block 71 and enhance wear resistance.

In the embodiment illustrated in FIGS. 3 and 4, the second block 72 has a stepped recess 63 having one end open to the circumferential main groove 21 or 22 and having, at its bottom, a step portion 9 protruding in the tire radial direction. Since the stepped recess 63 catches mud, gravel, snow, etc. during cornering, steering stability during cornering can be enhanced. Moreover, since the bottom of the stepped recess 63 is in a staircase shape, the end of the step portion 9 functions as an edge, and therefore edge components can be increased to further enhance traction performance. In addition, the staircase-shaped bottom enhances the block rigidity of the second block 72 to further enhance wear resistance.

In the embodiment illustrated in FIGS. 3 and 4, the second block 72 has a plurality of sipes 54 including a sipe 54a having two bent portions F.

In the embodiment illustrated in FIGS. 3 and 4, a sidewall 73a of the third block 73 facing the first sidewall portion 71c of the first block 71 has a larger dimension in the extending direction of the auxiliary groove 25 partitioning the first block 71 and the third block 73, than the first sidewall portion 71c. Moreover, the sidewall 73a of the third block 73 has an inclined wall on the circumferential main groove 21 or 22 side. When the first block 71 deforms as if collapsing toward the third block 73, the whole first sidewall portion 71c is supported by the sidewall 73a, so that the rigidity of the first block 71 can be enhanced to further enhance wear resistance. In addition, the chamfered first sidewall portion 71c of the first block 71 increases edge components to further improve traction performance.

In the embodiment illustrated in FIGS. 3 and 4, the third block 73 has a plurality of sipes 55.

In the embodiment illustrated in FIGS. 3 and 4, the inclined groove 8 that extends in the direction in which the second sidewall portion 71d of the other block portion 71b of the first block 71 is located is sandwiched between another first block 71 adjacent to the first block 71 and the second block 72. Moreover, a sidewall 72c of the second block 72 defined by the inclined groove 8 has a step portion 72d protruding toward the inclined groove 8. With this structure, the step portion 72d protruding toward the inclined groove 8 increases edge components, so that traction performance can be further improved.

While some of the disclosed embodiments have been described above, this disclosure is not limited to the foregoing embodiments. For example, three or more circumferential main grooves may be formed on the tread surface. Other various changes and modifications are possible.

EXAMPLES

Examples 1 to 12, Comparative Examples 1 to 2

To determine the advantageous effects according to this disclosure, tires of Examples 1 to 12 and tires of Comparative Examples 1 to 2 were experimentally produced and subjected to tests for evaluating tire performance. The specifications of each tire are listed in Table 1. The tests were conducted with each tire having tire size 265/65R17 being attached to an applicable rim, set to an internal pressure of 230 kPa, and mounted on a vehicle.

Each tire has two circumferential main grooves 21 and 22 continuously extending in the tread circumferential direction on a tread surface 1, as illustrated in FIG. 1.

<Quietness Test>

For each of the tires of Examples 1 to 12 and Comparative Examples 1 to 2, the lateral sound of the tire when running on an indoor drum test machine at a speed of 80 km/h was measured under conditions defined in JASO C606, to evaluate air column resonance sound. A relative value in the case where the evaluation result of the tire of Comparative Example 1 is 100 was used for evaluation, where a larger value indicates better quietness.

<Traction Test>

For each of the tires of Examples 1 to 12 and Comparative Examples 1 to 2, the traction force of the tire when running on an agricultural field (mud) at a speed of 5 km/h was measured. A relative value in the case where the evaluation result of the tire of Comparative Example 1 is 100 was used for evaluation, where a larger value indicates better traction performance.

<Steering Stability Test>

For each of the tires of Examples 1 to 12 and Comparative Examples 1 to 2, the running performance of the tire when running on a dry road surface was evaluated based on the driver's sensory assessment. A relative value in the case where the evaluation result of the tire of Comparative Example 1 is 100 was used for evaluation, where a larger value indicates better steering stability.

<Wear Test>

For each of the tires of Examples 1 to 12 and Comparative Examples 1 to 2, the rubber volume of lugs lost due to heel-and-toe wear after running on a concrete road surface for 20000 km at a speed of 40 km/h was measured. A relative value in the case where the evaluation result of the tire of Comparative Example 1 is 100 was used for evaluation, where a larger value indicates better wear resistance.

[Table 1]

TABLE 1

| | Example 1 | Example 2 | Example 3 | Example 4 | Example 5 | Example 6 | Example 7 | Example 8 |
|---|---|---|---|---|---|---|---|---|
| Recess 62 | Provided | Provided | Provided | Provided | Provided | Provided | Provided | Provided |
| Second block 72 | Provided | Provided | Provided | Provided | Provided | Provided | Provided | Provided |
| Third block 73 | Provided | Provided | Provided | Provided | Provided | Provided | Provided | Provided |
| Tire circumferential length of sidewall 71f > tire circumferential length of sidewall 71e | Yes | Yes | Yes | Yes | Yes | Yes | Yes | Yes |
| Second sidewall portion 71d in extending direction of groove 8 | Provided | Provided | Provided | Provided | Provided | Provided | Provided | Provided |
| Inclination angle of groove 8 extending in direction in which second sidewall portion 71d is located, with respect to circumferential direction | 30° | 30° | 30° | 30° | 30° | 30° | 30° | 30° |
| Step portion 72d | Provided | Provided | Provided | Provided | Provided | Provided | Provided | Not provided |
| Circumferential direction of second block 72 | Larger on width direction outer side | Larger on width direction outer side | Larger on width direction outer side | Larger on width direction outer side | Larger on width direction outer side | Larger on width direction outer side | Constant | Constant |
| Depression 71g | Provided | Provided | Provided | Provided | Provided | Not provided | Not provided | Not provided |
| End 72a | Provided | Provided | Provided | Provided | Not provided | Not provided | Not provided | Not provided |
| Chamfering of sidewall 72b of end 72a | Provided | Provided | Provided | Not provided | — | — | — | — |
| Stepped recess 63 | Provided | Provided | Not provided | Not provided | Not provided | Not provided | Not provided | Not provided |
| Wall portions 71e and 71f | Chamfered | Not chamfered | Not chamfered | Not chamfered | Not chamfered | Not chamfered | Not chamfered | Not chamfered |
| Connecting portion 62a | Curved shape | Not curved shape | Not curved shape | Not curved shape | Not curved shape | Not curved shape | Not curved shape | Not curved shape |
| Quietness test | 120 | 120 | 120 | 120 | 118 | 118 | 118 | 118 |
| Traction test | 125 | 122 | 120 | 118 | 115 | 113 | 113 | 110 |
| Steering stability test | 110 | 110 | 106 | 106 | 106 | 106 | 103 | 103 |
| Wear test | 115 | 110 | 108 | 108 | 108 | 108 | 108 | 108 |

TABLE 1-continued

|  | Example 9 | Example 10 | Example 11 | Example 12 | Comparative Example 1 | Comparative Example 2 |
|---|---|---|---|---|---|---|
| Recess 62 | Provided | Provided | Provided | Provided | Provided | Not provided |
| Second block 72 | Provided | Provided | Provided | Provided | Not provided | Provided |
| Third block 73 | Provided | Provided | Provided | Not provided | Not provided | Not provided |
| Tire circumferential length of sidewall 71f > tire circumferential length of sidewall 71e | Yes | Yes | No | No | No | No |
| Second sidewall portion 71d in extending direction of groove 8 | Provided | Not provided | Not provided | Not provided | Not provided | Not provided |
| Inclination angle of groove 8 extending in direction in which second sidewall portion 71d is located, with respect to circumferential direction | 50° | — | — | — | — | — |
| Step portion 72d | Not provided | Not provided | Not provided | Not provided | — | Not provided |
| Circumferential direction of second block 72 | Constant | Constant | Constant | Constant | — | Constant |
| Depression 71g | Not provided | Not provided | Not provided | Not provided | Not provided | Not provided |
| End 72a | Not provided | Not provided | Not provided | Not provided | — | — |
| Chamfering of sidewall 72b of end 72a | — | — | — | — | — | — |
| Stepped recess 63 | Not provided | Not provided | Not provided | Not provided | Not provided | Not provided |
| Wall portions 71e and 71f | Not chamfered | Not chamfered | Not chamfered | Not chamfered | Not chamfered | — |
| Connecting portion 62a | Not curved shape | Not curved shape | Not curved shape | Not curved shape | Not curved shape | — |
| Quietness test | 110 | 110 | 110 | 110 | 100 | 100 |
| Traction test | 110 | 108 | 106 | 104 | 100 | 92 |
| Steering stability test | 103 | 103 | 103 | 103 | 100 | 100 |
| Wear test | 108 | 108 | 108 | 104 | 100 | 100 |

As can be seen from Table 1, the tires of Examples 1 to 12 all exhibited improved quietness and improved wear resistance while further enhancing traction performance, as compared with the tires of Comparative Examples 1 to 2.

Examples 13 to 21

Tires of Examples 13 to 21 were experimentally produced and subjected to tests for evaluating tire performance. The specifications of each tire are listed in Table 2. The tests were conducted with each tire having tire size 215/55R17 being attached to an applicable rim, set to an internal pressure of 230 kPa, and mounted on a vehicle.

Each of the tires of Examples 13 to 21 has two circumferential main grooves 21 and 22 continuously extending in the tread circumferential direction on a tread surface 1, and has first to third blocks, as illustrated in FIG. 3.

<Traction Test>

For each of the tires of Examples 13 to 21, the traction force of the tire when running on an agricultural field (mud) at a speed of 5 km/h was measured. A relative value in the case where the evaluation result of the tire of Example 19 is 100 was used for evaluation, where a larger value indicates better traction performance.

<Wear Test>

For each of the tires of Examples 13 to 21, the rubber volume of lugs lost due to heel-and-toe wear after running on a concrete road surface for 20000 km at a speed of 40 km/h was measured. A relative value in the case where the evaluation result of the tire of Example 19 is 100 was used for evaluation, where a larger value indicates better wear resistance.

<Quietness Test>

For each of the tires of Examples 13 to 21, the lateral sound of the tire when running on an indoor drum test machine at a speed of 80 km/h was measured under conditions defined in JASO C606, to evaluate air column resonance sound. A relative value in the case where the evaluation result of the tire of Example 19 is 100 was used for evaluation, where a larger value indicates better quietness.

TABLE 2

|  | Example 13 | Example 14 | Example 15 | Example 16 | Example 17 | Example 18 | Example 19 | Example 20 | Example 21 |
|---|---|---|---|---|---|---|---|---|---|
| End 72a of second block 72 | Provided | Provided | Provided | Provided | Provided | Provided | Provided | Not provided | Not provided |
| Chamfering of end 72a | Provided | Provided | Provided | Provided | Provided | Provided | Not provided | Not provided | Not provided |
| Chamfering of sidewalls 71e and 71f of first block 71 | Provided | Provided | Provided | Provided | Provided | Not provided | Not provided | Not provided | Not provided |
| Connecting portion 62a of recess 62 | Curved shape | Curved shape | Curved shape | Curved shape | Curved shape | Not curved shape | Not curved shape | Not curved shape | Not curved shape |
| Shape of recess 62 | Triangle | Triangle | Triangle | Triangle | Square | Square | Square | Square | N/A |
| End 72 extending by at least ⅓ of inside of recess 62 | Yes | Yes | Yes | No | No | No | — | — | — |
| Sipe 53a | Provided | Provided | Not provided | Not provided | Not provided | Not provided | Not provided | — | — |
| Bending point F of sipe 53a | Provided | Not provided | Not provided | Not provided | Not provided | Not provided | Not provided | — | — |
| Traction test | 120 | 120 | 120 | 120 | 115 | 105 | 100 | 95 | 85 |
| Wear test | 120 | 115 | 110 | 105 | 105 | 100 | 100 | 100 | 100 |
| Quietness test | 120 | 120 | 120 | 115 | 115 | 115 | 100 | 95 | 95 |

As can be seen from Table 2, the tires of Examples 13 to 18 all exhibited sufficient block rigidity to improve wear resistance while further enhancing traction performance, as compared with the tires of Examples 19 to 21.

INDUSTRIAL APPLICABILITY

It is thus possible to provide a pneumatic tire that can improve quietness and wear resistance while further enhancing traction performance.

REFERENCE SIGNS LIST 1 tread surface
21 circumferential main groove
22 circumferential main groove
25 auxiliary groove
31 outer land portion
32 central land portion
33 outer land portion
41, 42 lug groove
51, 52 sipe
52a sipe
52b sipe
53 sipe
53a sipe
53b sipe
61 width direction recess
62 recess
62a connecting portion
63 stepped recess
71 first block
71a one block portion
71b other block portion
71c first sidewall portion
71d second sidewall portion
71e, 71f sidewall defining recess
71g depression
71i part
71h end
72 second block
72a end
72b sidewall
72c sidewall
72d step portion
73 third block
73a sidewall
8 inclined groove
9 step portion
CL tire equatorial plane
F bent portion
TE1, TE2 tread edge

The invention claimed is:

1. A pneumatic tire comprising:
on a tread surface, one or more land portions each of which is sandwiched between a plurality of circumferential main grooves continuously extending in a tire circumferential direction,
wherein at least one of the one or more land portions is partitioned into a plurality of blocks by auxiliary grooves including at least an inclined groove extending while being inclined with respect to a tire width direction, and
in a developed view of the tread surface, the plurality of blocks include:
a first block located on a tire equatorial plane and having a recess that is inclined with respect to the tire width direction; and
a second block located to face the recess of the first block,
wherein the second block has a stepped recess having one end open to one of the plurality of circumferential main grooves and having, at a bottom thereof, a step portion protruding in a tire radial direction, and
the step portion extends connectively between two sidewalls of two block portions of the second block defining the stepped recess,
wherein a sidewall portion of one block portion from among two block portions that define the recess of the first block, is located in an extending direction of the inclined groove inclined with respect to the tire width direction, the sidewall portion being adjacent to the recess, and
wherein the inclined groove is sandwiched between another first block, adjacent to the first block, and the second block, and a sidewall of the second block defined by the inclined groove has a step portion protruding toward the inclined groove.

2. The pneumatic tire according to claim 1,
wherein the second block has an end extending toward the recess of the first block, and
the end of the second block extending toward the recess of the first block is configured such that its sidewall facing the recess of the first block is chamfered on a tread surface side.

3. The pneumatic tire according to claim 1,
wherein in the one block portion and an other block portion of the first block that define the recess of the first block, respective sidewalls defining the recess of the first block are chamfered on a tread surface side, and
in the developed view of the tread surface, a connecting portion connecting, in the recess of the first block, the respective sidewalls of the one block portion and the other block portion defining the recess of the first block has a curved shape.

4. The pneumatic tire according to claim 1,
wherein a tire circumferential dimension of the second block increases outward in the tire width direction relative to its tire width direction central portion.

5. The pneumatic tire according to claim 1,
wherein the first block has a depression formed in a sidewall, opposite to a sidewall where the recess is formed, and depressed inward, and
the depression faces a protrusion of a sidewall of another first block, adjacent to the first block, where the depression is formed.

6. The pneumatic tire according to claim 1,
wherein the second block has an end extending to inside of the recess of the first block along a side surface of the recess.

7. The pneumatic tire according to claim 1,
wherein in the developed view of the tread surface, the recess of the first block has a triangular shape.

8. The pneumatic tire according to claim 1,
wherein in the developed view of the tread surface, an end of the second block extending toward the recess of the first block extends from an opening position of the recess of the first block to inside of the recess of the first block by at least ⅓ of a distance between the opening position of the recess of the first block and a wall portion of the recess farthest from the opening position.

9. The pneumatic tire according to claim 1,
wherein the first block has a sipe having one end open to the recess of the first block.

10. The pneumatic tire according to claim 9,
wherein in the developed view of the tread surface, the sipe has a bent portion, and has an other end open to the auxiliary groove.

11. The pneumatic tire according to claim 1,
wherein the plurality of blocks further include
a third block located to face a first sidewall portion of an other block portion, from among the two block portions that define the recess of the first block, the first sidewall portion being adjacent to the recess.

12. The pneumatic tire according to claim 11,
wherein a tire circumferential length of a sidewall, defining the recess, of the one block portion, from among the two block portions that define the recess of the first block, is longer than a tire circumferential length of a sidewall, defining the recess, of the other block portion.

13. The pneumatic tire according to claim 11,
wherein the second block has an end extending toward the recess of the first block, and
the end of the second block extending toward the recess of the first block is configured such that its sidewall facing the recess of the first block is chamfered on a tread surface side.

14. The pneumatic tire according to claim 11,
wherein in the one block portion and the other block portion of the first block that define the recess of the first block, respective sidewalls defining the recess of the first block are chamfered on a tread surface side, and
in the developed view of the tread surface, a connecting portion connecting, in the recess of the first block, the respective sidewalls of the one block portion and the other block portion defining the recess of the first block has a curved shape.

15. The pneumatic tire according to claim 11,
wherein a tire circumferential dimension of the second block increases outward in the tire width direction relative to its tire width direction central portion.

16. The pneumatic tire according to claim 11,
wherein the first block has a depression formed in a sidewall, opposite to a sidewall where the recess is formed, and depressed inward, and
the depression faces a protrusion of a sidewall of another first block, adjacent to the first block, where the depression is formed.

17. A pneumatic tire comprising:
on a tread surface, one or more land portions each of which is sandwiched between a plurality of circumferential main grooves continuously extending in a tire circumferential direction,
wherein at least one of the one or more land portions is partitioned into a plurality of blocks by auxiliary grooves including at least an inclined groove extending while being inclined with respect to a tire width direction, and
in a developed view of the tread surface, the plurality of blocks include:
a first block located on a tire equatorial plane and having a recess that is inclined with respect to the tire width direction; and
a second block located to face the recess of the first block,
wherein the second block has a stepped recess having one end open to one of the plurality of circumferential main grooves and having, at a bottom thereof, a step portion protruding in a tire radial direction, and
the step portion extends connectively between two sidewalls of two block portions of the second block defining the stepped recess, and
wherein the first block has a depression formed in a sidewall, opposite to a sidewall where the recess is formed, and depressed inward, and
the depression faces a protrusion of a sidewall of another first block, adjacent to the first block, where the depression is formed.

18. A pneumatic tire comprising:
on a tread surface, one or more land portions each of which is sandwiched between a plurality of circumferential main grooves continuously extending in a tire circumferential direction,
wherein at least one of the one or more land portions is partitioned into a plurality of blocks by auxiliary grooves including at least an inclined groove extending while being inclined with respect to a tire width direction, and in a developed view of the tread surface, the plurality of blocks include:

a first block located on a tire equatorial plane and having a recess that is inclined with respect to the tire width direction; and a second block located to face the recess of the first block, wherein the second block has a stepped recess having one end open to one of the plurality of circumferential main grooves and having, at a bottom thereof, a step portion protruding in a tire radial direction, and the step portion extends connectively between two sidewalls of two block portions of the second block defining the stepped recess, wherein the plurality of blocks further include a third block located to face a first sidewall portion of a block portion, from among two block portions that define the recess of the first block, the first sidewall portion being adjacent to the recess, and wherein the first block has a depression formed in a sidewall, opposite to a sidewall where the recess is formed, and depressed inward, and the depression faces a protrusion of a sidewall of another first block, adjacent to the first block, where the depression is formed.

* * * * *